(12) United States Patent
Zhang

(10) Patent No.: US 8,161,659 B2
(45) Date of Patent: Apr. 24, 2012

(54) MEASUREMENT DEVICE

(75) Inventor: Bing-Jun Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 148 days.

(21) Appl. No.: 12/822,239

(22) Filed: Jun. 24, 2010

(65) Prior Publication Data

US 2011/0214306 A1 Sep. 8, 2011

(30) Foreign Application Priority Data

Mar. 4, 2010 (CN) .......................... 2010 1 0117951

(51) Int. Cl.
*A45B 3/08* (2006.01)
(52) U.S. Cl. ............................................. 33/712; 33/700
(58) Field of Classification Search .................. 33/712, 33/700–701, 714–718; 269/104, 107
See application file for complete search history.

(56) References Cited

U.S. PATENT DOCUMENTS

| 5,873,173 A | * | 2/1999 | Redmond | ...................... 33/603 |
| 7,857,295 B2 | * | 12/2010 | Zhang et al. | .................. 269/152 |
| 2011/0024962 A1 | * | 2/2011 | Zhang | .......................... 269/107 |

* cited by examiner

*Primary Examiner* — G. Bradley Bennett
*Assistant Examiner* — Tania Courson
(74) *Attorney, Agent, or Firm* — Altis Law Group, Inc.

(57) ABSTRACT

The disclosure provides a measurement device for measuring a work piece defining a first circular hole and a second circular hole. The measurement device includes a base, a location member fixed on the base, a fixing pin fixed on the location member, and a measuring pin slidably positioned on the location member. The fixing pin and the measuring pin are configured for being received in the first circular hole and the second circular hole of the work piece, respectively. A diameter of the measuring pin is substantially equal to a standard diameter of the second circular hole minus doubled tolerance. The distance between axes of the fixing pin and the measuring pin is substantially equal to a standard value of the distance between centers of the first and second circular holes of the work piece.

20 Claims, 6 Drawing Sheets

MEASUREMENT DEVICE

BACKGROUND

1. Technical Field

The present disclosure generally relates to a measurement device, and more particularly, to a device for measuring a distance between axes of two holes in a work piece.

2. Description of Related Art

A work piece, with two holes defined therein, is often assembled with other elements. Accordingly, the distance between the holes is required to fall within a predetermined range to ensure that assembly is successful. Measurement of the distance between the holes in the work piece is thus necessary before assembly.

However, accurate location of the centers of the holes is difficult during measurement, making conventionally used tools impractical. If a projection measuring method or a three-dimensional measurement device is utilized, the measuring process is likely to be protracted and complex.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
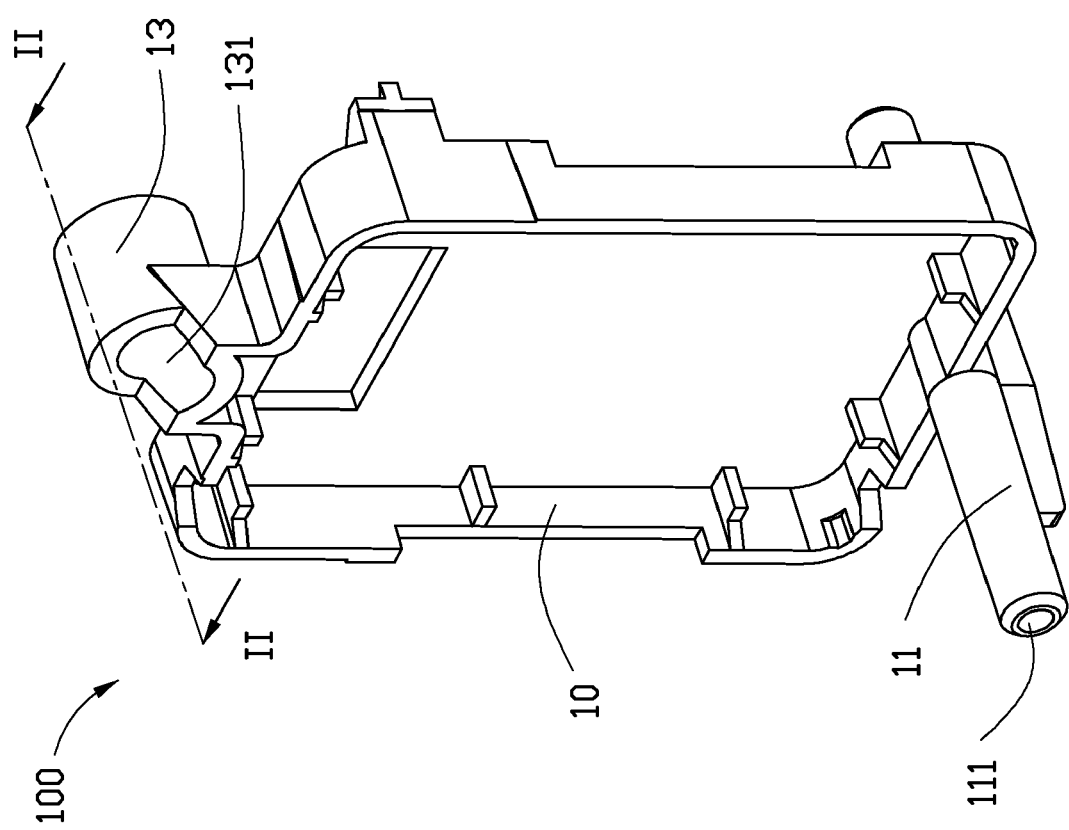
FIG. 1 is an isometric view of an embodiment of a work piece.
Figure 2:
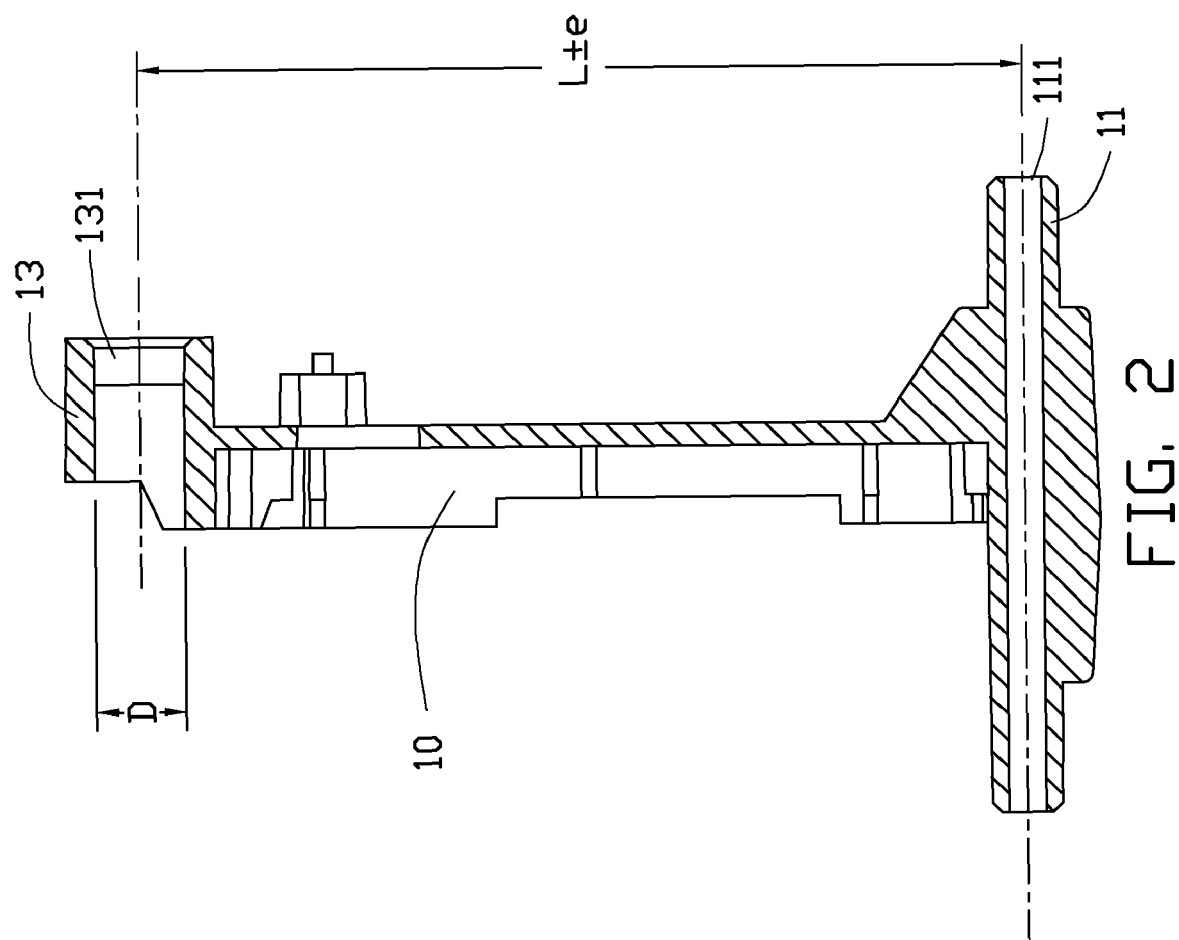
FIG. 2 is a cross-section of FIG. 1, taken along line II-II.

Referring to FIGS. 1 and 2, an exemplary work piece 100 is a substantially rectangular housing including a main body 10, a first tube portion 11, and a second tube portion 13. The main body 10 includes a baseboard (not labeled) and a sidewall (not labeled) extending substantially perpendicular to a surrounding edge of the baseboard. The first tube portion 11 extends from two sides of the main body 10 and defines a first circular hole 111. The second tube portion 13 extends to one side of the main body 10 and defines a second circular hole 131. The second circular hole 131 has a diameter D which is a standard diameter of the second circular hole 131. The distance between centers of the first and second circular holes 111, 131 is in a range of L±e, wherein L is a standard value of the distance between the centers of the first and second circular holes 111, 131, and e is a tolerance therebetween. The distance between the first and second holes 111, 131 is required to be secured in the absolute range of L±e.

Figure 3:
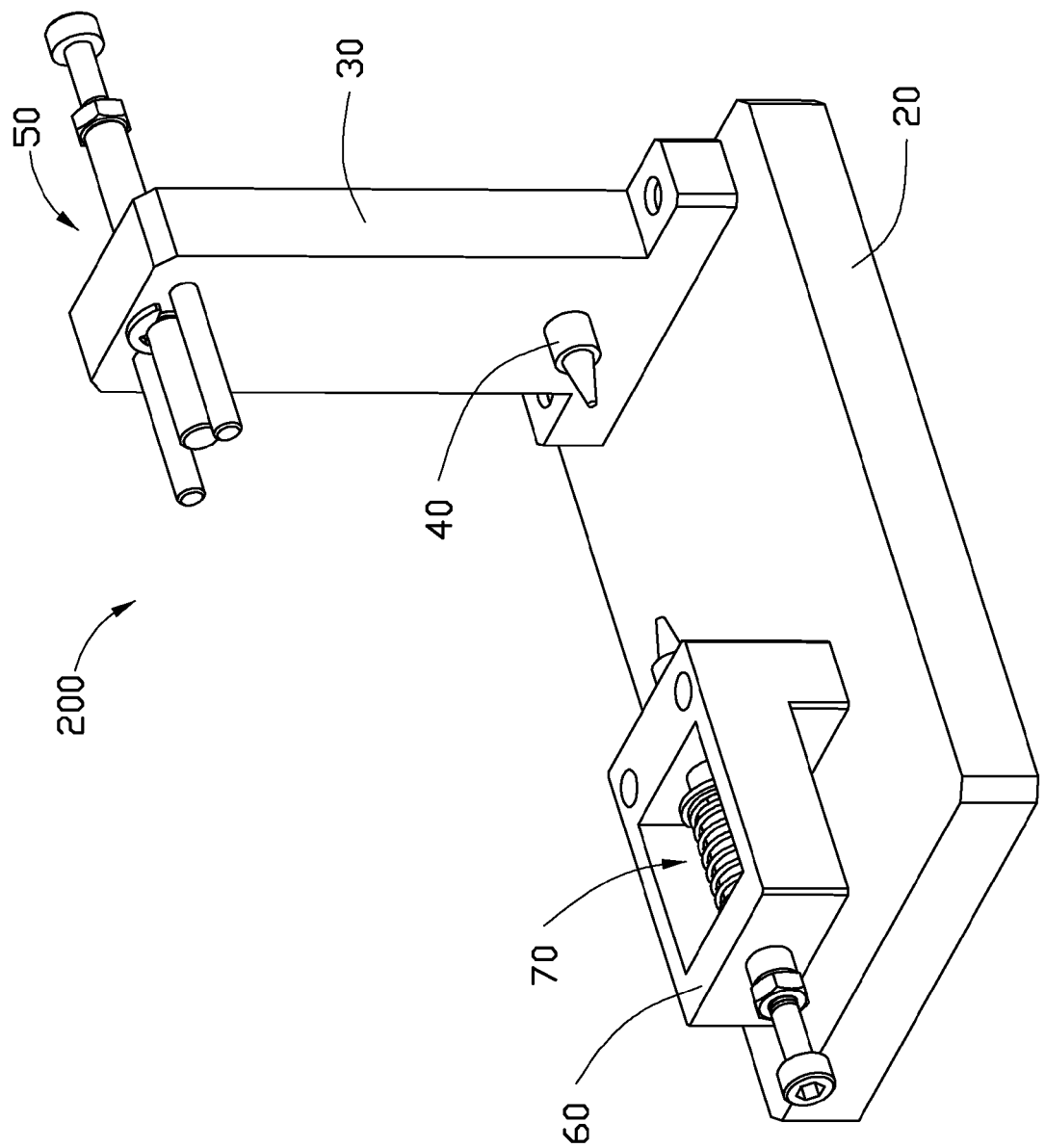
FIG. 3 is an assembled, isometric view of an embodiment of a measurement device.

Referring to FIG. 3, a measurement device 200 according to an embodiment includes a base 20, a location member 30 fixed on the base 20, a fixing pin 40, a measuring assembly 50, a fixing block 60 and an orientation assembly 70. The fixing pin 40 is fixed on the location member 30. The measuring assembly 50 is slidably positioned on the location member 30. The fixing block 60 is fixed on the base 20. The orientation assembly 70 is movably positioned on the fixing block 60.

Figure 4:
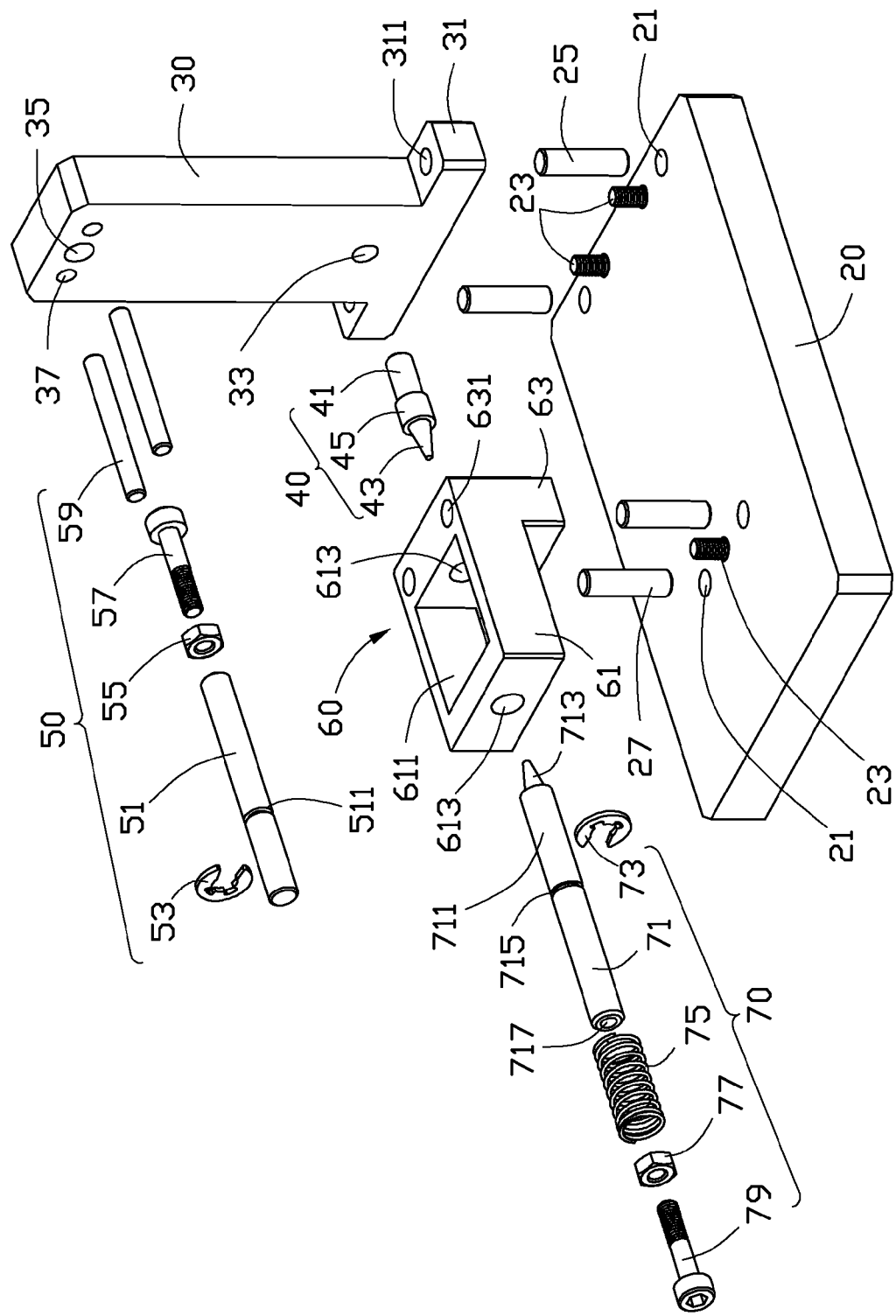
FIG. 4 is an exploded, isometric view of the measurement device of FIG. 3.

Referring to FIG. 4, the base 20 is substantially rectangular. The base 20 defines a plurality of guide holes 21 and fastener holes (not labeled) therein. The measurement device 200 further comprises a plurality of fasteners 23, two first guiding shafts 25, and two second guiding shafts 27 received in the guide holes 21.

The location member 30 is a substantially T-shaped board and forms two supporting portions 31 on opposite sides of a bottom end thereof. Each supporting portion 31 defines a fixing hole 311. The location member 30 further defines a first pin hole 33 for the fixing pin 40, a through hole 35, and two second pin holes 37 adjacent to two sides of the through hole 35. The through hole 35 and the first pin hole 33 are defined in a central line of the location member 30, and a distance therebetween is L. The through hole 35 and the second pin holes 37 are defined adjacent to a top portion of the location member 30.

The fixing pin 40 includes a cylindrical main body 41, an receiving portion 43, and a location flange 45 between the main body 41 and the receiving portion 43. The main body 41 has a diameter equaling or exceeding a diameter of the pin hole 33 of the location member 30. Therefore, the main body 41 is capable of being fixed in the pin hole 33 of the location member 30. The receiving portion 43 is substantially a cone with a large end connected to the location flange 45. The first hole 111 of the work piece 100 has a diameter between the minimum diameter and the maximum diameter of the receiving portion 43, thus the receiving portion 43 is capable of being received in the first hole 111. The location flange 45 abuts a portion adjacent to the pin hole 33 of the location member 30 to prevent the fixing pin 40 from sliding relative to the location member 30. Alternatively, the location flange 45 may be omitted if the fixing pin 40 is molded with the location member 30.

The measuring assembly 50 includes a measuring pin 51, a first locking member 53, a second locking member 55, a fastener 57, and two pins 59. The measuring pin 51 is a substantially cylindrical, having a diameter of d, where d=D−2e, that is, the diameter d is substantially equal to D minus doubled e. The diameter of the measuring pin 51 is substantially equal to a diameter of the through hole 35 of the location member 30, thus the measuring pin 51 is capable of passing through the through hole 35 of the location member 30. The measuring pin 51 defines an annular groove 511 receiving the first locking member 53. One end of the measuring pin 51 defines a fastener hole (not shown) at an end surface for receiving the fastener 57. The second locking member 55 is sleeved on the fastener 57 such that the first and second locking members 53, 55 are positioned on opposite sides of the location member 30. In the illustrated embodiment, the first locking member 53 is a snap ring, and the second locking member 55 is a threaded retainer. Two pins 59 are positioned on opposite sides of the measuring pin 51 and parallel to each other, and one end of each pin 59 is fixedly received in one of the second pin holes 37. A distance between the pins 59 exceeds the diameter of the second tube portion 13 of the work piece 100.

The fixing block 60 includes a substantially rectangular guide portion 61 and a holding portion 63 connected to one end of the guide portion 61. The holding portion 63 is substantially perpendicular to the guide portion 61. The guide portion 61 defines a receiving hole 611 substantially rectangular and two guide holes 613 communicating with the receiving hole 611. The fixing block 60 defines two holes 631 passing through both the holding portion 63 and the guide portion 61.

The orientation assembly 70 includes a pin 71, a first latching member 73, a resilient member 75, a second latching member 77, and a fastener 79. The pin 71 includes a shaft portion 711 and a received portion 713 formed on an end of the shaft portion 711. The shaft portion 711 has a diameter less than those of the guide holes 613. The shaft portion 711 defines an annular groove 715, that receives the first latching member 73, and a fastener hole 717 in the axis direction received in the fastener 79. The resilient member 75 is sleeved on the shaft portion 711 and received in the receiving hole 611 of the fixing block 60. The second latching member 77 is threadedly engaged with the fastener 79. In the illustrated embodiment, the first latching member 73 is a snap ring, the resilient member 75 is a coil spring, and the second latching member 77 is a threaded retainer. Alternatively, the resilient member 75 may be a plurality of elastic plates, and the second latching member 77 a pin.

Figure 5:
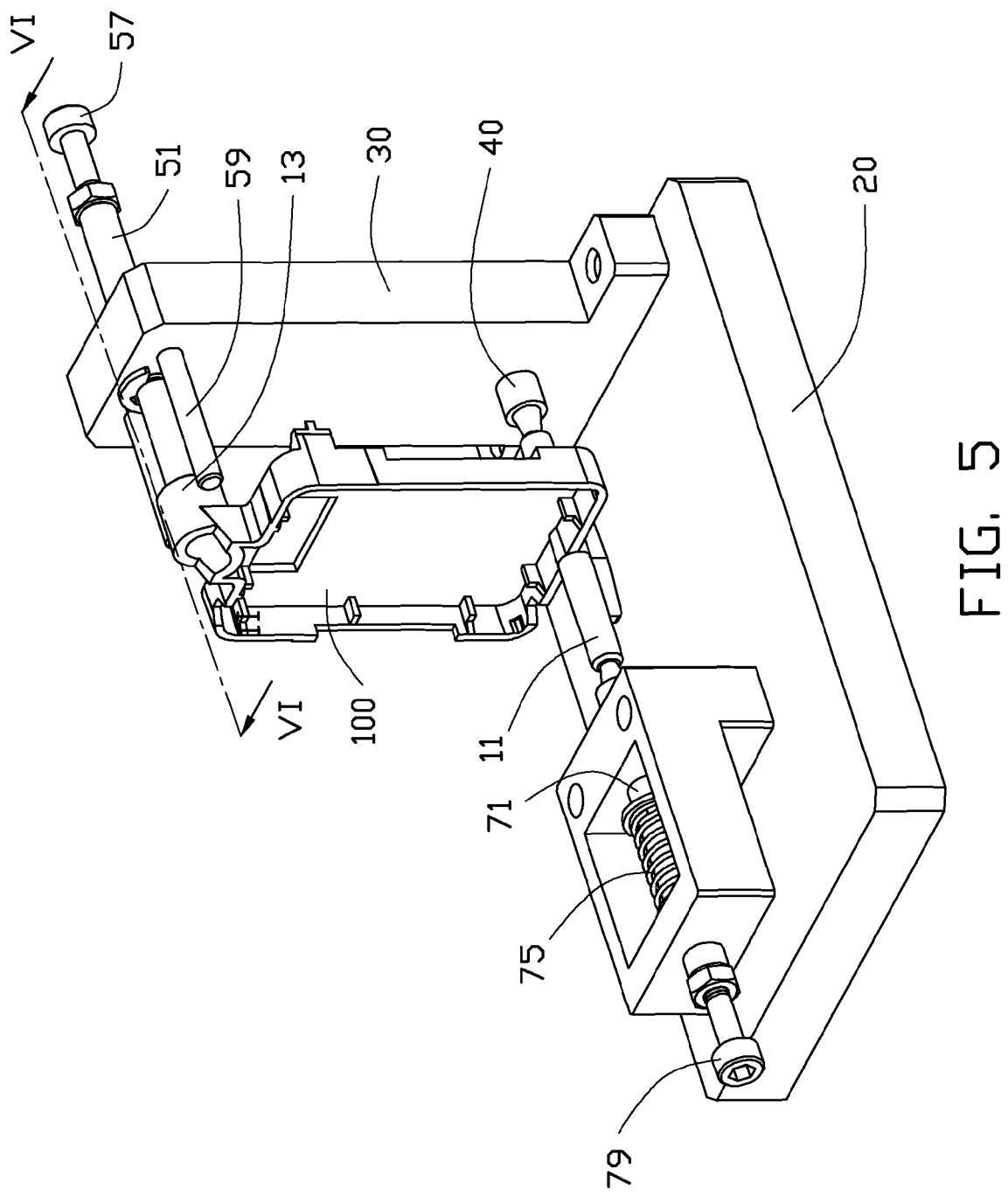
FIG. 5 is an isometric view of the measurement device applied for measuring the work piece.

Also referring to FIG. 5, during assembly of the measurement device 200, the location member 30 is fixed on the base 20 by the fasteners 23 and the first guiding shafts 25 passing through the guide holes 21 of the base 20 and the fixing holes 311 of the location member 30. The main body 41 of the fixing pin 40 is received in the pin hole 33 of the location member 30. The measuring pin 51 passes through the location member 30, the first locking member 53 is received in the annular groove 511, and the fastener 57 passes through the second locking member 55 and is partially received in the fastener hole of the measuring pin 51. Therefore, a portion of the measuring pin 51 between the first and second locking members 53, 55 is capable of sliding relative to the location member 30. Each pin 59 is fixed on the location member 30 with one end received in one of the second pin holes 37.

The fixing block 60 is fixed on the base 20 by the fasteners 23 and the second guiding shafts 27 passing through the holes 631 of the fixing block 60 and the guide holes 21. The resilient member 75 is received in the receiving hole 611 of the fixing block 60. The received portion 713 of the pin 71 passes through one guide hole 613, the resilient member 75, and the other guide hole 613 in that order. Furthermore, the first latching member 73 is received in the annular groove 715 of the pin 71. Therefore, opposite ends of the resilient member 75 resist the inner sidewall of the receiving hole 611 and the first latching member 73. The fastener 79 passes through the second latching member 77 and is partially received in the pin 71. Thereby, a portion of the pin 71 between the first and second latching members 73, 77 is capable of sliding relative to the fixing block 60. The measurement device 200 is thus assembled.

Figure 6:
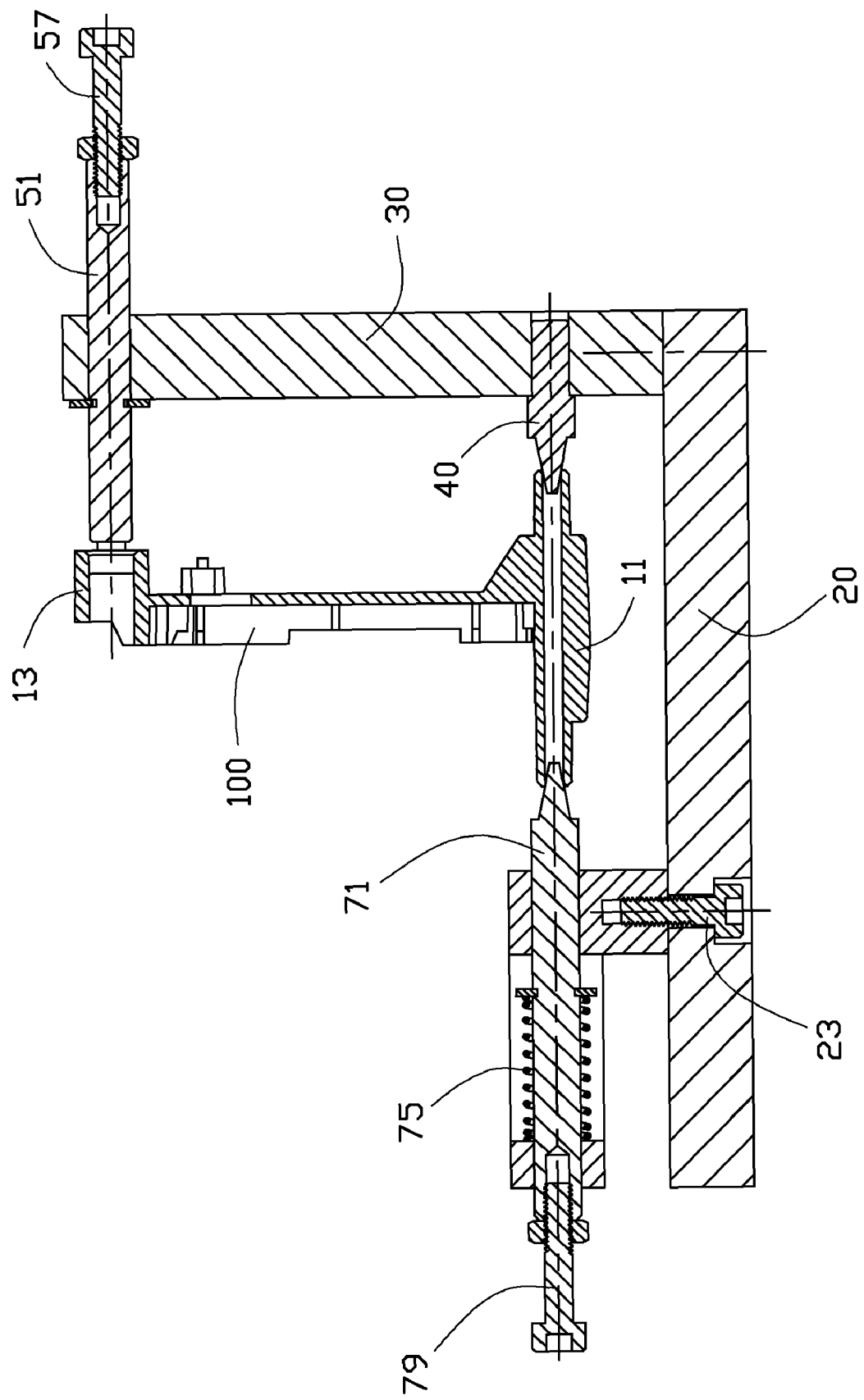
FIG. 6 is a cross-section of the measurement device and the work piece of FIG.

Also referring to FIGS. 1 and 6, in use, the work piece 100 is installed on the measurement device 200 to be measured. During installation, the fastener 79 of the orientation assembly 70 is pulled away from the location member 30. The resilient member 75 is compressed. The work piece 100 is received between the pin 71 and the location member 30, and the first tube portion 11 thereof is sleeved on the receiving portion 43 of the fixing pin 40. The pin 71 is released, such that the received portion 713 thereof is received in the first tube portion 11 of the work piece 100 by the biasing force of the resilient member 75. Therefore, the work piece 100 is fixed by the receiving portion 43 of the fixing pin 40 and the received portion 713 of the pin 71, and a central axis of the first tube portion 11 of the work piece 100 is aligned with the axes of the fixing pin 40 and the pin 71.

The second tube portion 13 of the work piece 100 is capable of swinging between two pins 59 of the measuring assembly 50 around the axis of the first tube portion 11 while the first tube portion 11 is fixed. The pins 59 provide initial orientation of the second tube portion 13 of the work piece 100. The fastener 57 is pulled to slide the measuring pin 51 towards the second tube portion 13 of the work piece 100. If the measuring pin 51 can be received in the second tube portion 13 of the work piece 100, it can be concluded that the distance between the axes of the first circular hole 111 of the first tube portion 11 and the second circular hole 131 of the second tube portion 13 are in a range of L±e, such that the work piece 100 is acceptable. On the contrary, if the measuring pin 51 cannot be received in the second tube portion 13, it can be concluded that the work piece 100 is unacceptable.

The measurement device 200 has a simple structure and is easily manipulated.

Alternatively, the first and second locking members 53, 55 of the measuring assembly 50 and the first and second latching members 73, 77 of the orientation assembly 70 can be omitted, with two ends of the resilient member 75 of the orientation assembly 70 resisting the inner sidewall of the receiving hole 611 of the fixing block 60. Both the fixing block 60 and the orientation assembly 70 can be omitted, and force on the work piece 100 provides contact with the fixing pin 40. The pins 59 of the measuring assembly 50 may be omitted, and the initial orientation to the work piece 100 omitted correspondingly.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A measurement device for measuring a work piece defining a first circular hole and a second circular hole, comprising:
    a base;
    a location member fixed on the base;
    a fixing pin fixed on the location member to be received in the first circular hole of the work piece; and
    a measuring pin slidably positioned on the location member to be received in the second circular hole of the work piece, wherein a diameter of the measuring pin is substantially equal to a standard diameter of the second circular hole minus two times a tolerance;
    wherein the distance between axes of the fixing pin and the measuring pin is substantially equal to a standard value of the distance between centers of the first circular hole and the second circular hole of the work piece.

2. The measurement device of claim 1, wherein the measuring pin is substantially parallel to the fixing pin.

3. The measurement device of claim 1, wherein the fixing pin comprises a main body and a receiving portion, the main body is fixed on the location member, and the receiving portion is substantially a cone.

4. The measurement device of claim 3, wherein the fixing pin further comprises a location flange between the main body and the receiving portion.

5. The measurement device of claim 1, further comprising an orientation assembly comprising a pin aligned with the fixing pin on the location member.

6. The measurement device of claim 5, further comprising a fixing block fixed on the base and defining a receiving hole, and the orientation assembly further comprises a resilient member received in the receiving hole of the fixing block.

7. The measurement device of claim 6, wherein the orientation assembly further comprises a first latching member and a second latching member, the pin of the orientation assembly defines an annular groove in which the first latching member is received, and the second latching member is fixed on one end of the pin, a first end of the resilient member abuts the first latching member, and a second end of the resilient member abuts an inner sidewall of the receiving hole of the fixing block.

8. The measurement device of claim 7, wherein the orientation assembly further comprises a fastener, and the pin of the orientation assembly defines a fastener hole received in the fastener, and the second latching member is a threaded retainer received in the fastener.

9. The measurement device of claim 1 further comprising a first locking member and a second locking member, wherein the measuring pin defines an annular groove in which the first locking member is received, and the second locking member is fixed on one end of the measuring pin; and the first locking member and the second locking member are positioned on different sides of the location member.

10. The measurement device of claim 9 further comprising a fastener; wherein the measuring pin defines a fastener hole at an end surface for receiving the fastener, and the second locking member is a threaded retainer received in the fastener.

11. The measurement device of claim 1 further comprising two parallel pins fixed on the location member and positioned on opposite sides of the measuring pin.

12. A measurement device comprising:
a base;
a location member fixed on the base;
a fixing pin fixed on the location member; and
a measuring pin slidably positioned on the location member, wherein a diameter of the measuring pin is substantially equal to a standard diameter hole minus two times a tolerance;
an orientation assembly comprising a pin aligned with the fixing pin on the location member,
wherein the fixing pin comprises a main body and a receiving portion, the main body is fixed on the location member, and the receiving portion is substantially a cone; and the distance between axes of the fixing pin and the measuring pin is substantially equal to a standard value.

13. The measurement device of claim 12, wherein the measuring pin is substantially parallel to the fixing pin.

14. The measurement device of claim 12, wherein the fixing pin further comprises a location flange between the main body and the receiving portion.

15. The measurement device of claim 12, further comprising a fixing block fixed on the base and defining a receiving hole, and the orientation assembly further comprises a resilient member received in the receiving hole of the fixing block.

16. The measurement device of claim 15, wherein the orientation assembly further comprises a first latching member and a second latching member, the pin of the orientation assembly defines an annular groove in which the first latching member is received; and the second latching member is fixed on one end of the pin, a first end of the resilient member abuts the first latching member, and a second end of the resilient member abuts an inner sidewall of the receiving hole of the fixing block.

17. The measurement device of claim 16, wherein the orientation assembly further comprises a fastener, and the pin of the orientation assembly defines a fastener hole received in the fastener, and the second latching member is a threaded retainer received in the fastener.

18. The measurement device of claim 12 further comprising a first locking member and a second locking member, wherein the measuring pin defines an annular groove in which the first locking member is received, and the second locking member is fixed on one end of the measuring pin; and the first locking member and the second locking member are positioned on different sides of the location member.

19. The measurement device of claim 18 further comprising a fastener; wherein the measuring pin defines a fastener hole at an end surface for receiving the fastener, and the second locking member is a threaded retainer received in the fastener.

20. The measurement device of claim 12 further comprising two parallel pins fixed on the location member and positioned on opposite sides of the measuring pin.

* * * * *